United States Patent
Makkapati et al.

(10) Patent No.: US 7,365,673 B2
(45) Date of Patent: Apr. 29, 2008

(54) COMPRESSION AND TRANSMISSION OF WEATHER DATA

(75) Inventors: Vishnu V. Makkapati, Ongole (IN); Pravas R. Mahapatra, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 293 days.

(21) Appl. No.: 11/027,557

(22) Filed: Dec. 30, 2004

(65) Prior Publication Data

US 2006/0145912 A1    Jul. 6, 2006

(51) Int. Cl.
*G01S 13/95*    (2006.01)
(52) U.S. Cl. ............... 342/26 R; 342/179; 342/195; 342/58
(58) Field of Classification Search ............... 342/26 R
See application file for complete search history.

(56) References Cited

U.S. PATENT DOCUMENTS

| | | | |
|---|---|---|---|
| 4,884,971 A * | 12/1989 | Chan et al. ............... 434/2 |
| 5,135,397 A * | 8/1992 | Yen ............... 434/2 |
| 5,150,431 A * | 9/1992 | Yoshida et al. ............. 382/242 |
| 5,179,638 A | 1/1993 | Dawson et al. |
| 5,363,107 A | 11/1994 | Gertz et al. |
| 5,524,064 A * | 6/1996 | Oddou et al. ............... 382/180 |
| 5,907,568 A | 5/1999 | Reitan, Jr. |
| 5,987,459 A | 11/1999 | Swanson et al. |
| 6,043,756 A * | 3/2000 | Bateman et al. ............. 340/945 |
| 6,128,578 A | 10/2000 | Sakaino et al. |
| 6,295,073 B1 | 9/2001 | Shigenaga |
| 6,563,452 B1 | 5/2003 | Zheng et al. |
| 6,614,425 B1 | 9/2003 | Burdon |
| 6,828,922 B1 | 12/2004 | Gremmert et al. |
| 7,039,505 B1 * | 5/2006 | Southard et al. ............... 701/3 |
| 7,129,885 B1 * | 10/2006 | Woodell et al. ........... 342/26 B |
| 2001/0056316 A1 | 12/2001 | Johnson et al. |
| 2003/0063812 A1 | 4/2003 | Burke |
| 2003/0086605 A1 * | 5/2003 | Doner ............... 382/166 |
| 2004/0012563 A1 | 1/2004 | Papakipos et al. |
| 2004/0208341 A1 | 10/2004 | Zhou et al. |
| 2005/0089237 A1 * | 4/2005 | Park et al. .................. 382/242 |

OTHER PUBLICATIONS

"Non-Final Office Action mailed Oct. 3, 2007 in U.S. Appl. No. 11/809,030, 9 pgs.", OARN,9 Pages.
Figueiredo, et al., "Unsupervised Contour Representation and Estimation Using B-splines and a Minmum Description Length Criterion", *IEEE Transactions on Image Processing*,9, (Jun. 6, 2000),1075-1087.

* cited by examiner

*Primary Examiner*—Thomas H. Tarcza
*Assistant Examiner*—Matthew M Barker
(74) *Attorney, Agent, or Firm*—Schwegman, Lundberg & Woessner, P.A.

(57) ABSTRACT

Weather radar reflectivity data is compressed by converting radar data to image pixels. Next, contours are traced from select groupings of the pixels. Control points are derived from the contours. The control points represent a compressed version of the radar data and may be used to recreate and fill the contours with predefined colors or effects for purposes of visually depicting weather phenomena.

17 Claims, 3 Drawing Sheets

COMPRESSION AND TRANSMISSION OF WEATHER DATA

FIELD

The invention relates generally to data compression and more particularly to compression of weather radar reflectivity data.

BACKGROUND

Real-time weather information is of vital importance for a world that is increasingly mobile. In response to this, a variety of techniques have been created to communicate real-time weather information. One popular and pervasive technique uses radar.

With radar bursts of energy waves are transmitted from a source transmitter out over a large geographical area within the atmosphere. When the energy waves encounter the presence of matter in the atmosphere, small portions of the transmitted energy waves are reflected back to a receiver usually co-located with the source. The source/receiver can then process this reflected energy to determine what type of matter was encountered within the atmosphere, such as predefined weather phenomena (e.g., precipitation, degrees of precipitation, etc.) Some reflected energy may be spurious scatterers representing such things as birds, insects, planes, and the like. These spurious reflections may be disregarded. It should be noted that source/receivers do not have to be stationary devices. That is, in some cases, aircraft may be equipped with radar source/receiver equipment.

The reflected energy readings are transmitted over radio or satellite channels as weather radar reflectivity data. This data is voluminous and transmitted as values representing decibels of Z (dBZ). Z represents the normalized amount of energy reflected back from weather phenomena within the atmosphere.

One area where weather phenomena are of vital importance is aviation. The most common reason for delaying flights is weather conditions. In order for weather information to be useful to a pilot of an aircraft it is transmitted via ground-to-aircraft (ground-to-air) wireless communication links. However, radar reflectivity data is voluminous, such that a ground-to-air wireless communication link's bandwidth can quickly become overburdened and taxed to capacity during a transmission of radar reflectivity data. Moreover, wireless ground-to-air bandwidth is a precious resource that is closely guarded and managed during a flight. Demands for high ground-to-air and/or air-to-ground bandwidth entail large operational expenditures for airlines and other users.

Two popular data compression techniques have been used to address data compression. The first approach is referred to as lossy compression. With lossy compression some data is lost during compression and is not recoverable when it is subsequently decompressed. The benefit of lossy compression is that an original data file may experience a larger reduction in its size when it is compressed. The drawback of lossy compression is that when the data file is decompressed some vital information may not be present and may not be recoverable. Thus, lossy compression is often not acceptable to pilots because image quality associated with weather phenomena is degraded with lossy compression techniques.

A second approach is lossless compression. With lossless compression a compressed data file is fully recovered when it is subsequently decompressed. Lossless compression is popular with the compression associated with text files, word processing files, spreadsheet files, and the like where any loss of data can be considered catastrophic from a user's point of view. The drawback of lossless compression is that the size of the data file is not substantially reduced when compressed. Therefore, lossless compression is often not acceptable because it does not maximally address the bandwidth problem associated with transmitting ground-to-air weather radar reflectivity data.

A variety of other approaches have been attempted that yield compression performance between the extremes of lossy compression and lossless compression. For example, techniques have attempted to reduce spatial redundancy within a compressed data file. However, these techniques have generally only been capable of reducing the size of an original data file by a factor of about 10. Other techniques have used vector quantization to exploit linear and nonlinear relationships within a data file being compressed; but these techniques suffer from a lack of universal definitions needed to effectively compress and decompress a variety of data types. In still other techniques, there have been attempts to use progressive image transmission (PIT) schemes for transmitting the most significant information from a data file sequentially until it can be successfully reconstructed. PIT techniques fail to communicate sufficient boundary information and internal details during initial transmissions, though the picture is reconstructed well when the data transmission is complete.

Recently, schemes for context based image transmission (CBIT) have emerged for medical images. These schemes utilize knowledge about image composition to segment, label, prioritize, and fit geometric models to regions of an image. However, these schemes are not readily adapted to radar data due to the complexity and randomness of weather data fields, and the lack of prior knowledge about the dynamic shapes that can be associated with weather features (weather patterns).

Still other techniques have been proposed, but none of these can achieve sufficient data size reduction on radar data while retaining an acceptable level of quality, and none of these can sufficiently address the randomness associated with shapes of weather patterns represented within radar data.

Therefore, there is a need for an improved data compression and decompression technique for weather radar reflectivity data.

SUMMARY

In various embodiments, weather radar reflectivity data is represented as a plurality of control points. More specifically, radar reflectivity data is converted into a binary image of pixels. Boundaries of groupings of the pixels are traced within the image as contours. A plurality of control points are derived from each contour. The control points are transmitted to a recipient as a compressed version of the original radar reflectivity data.

A recipient reconstructs the contours from the control points. In an embodiment, each contour is filled with a unique color representing weather phenomena and the colored contours are overlaid on a cartographic grid representing a given geographic area.

DETAILED DESCRIPTION

Figure 1:
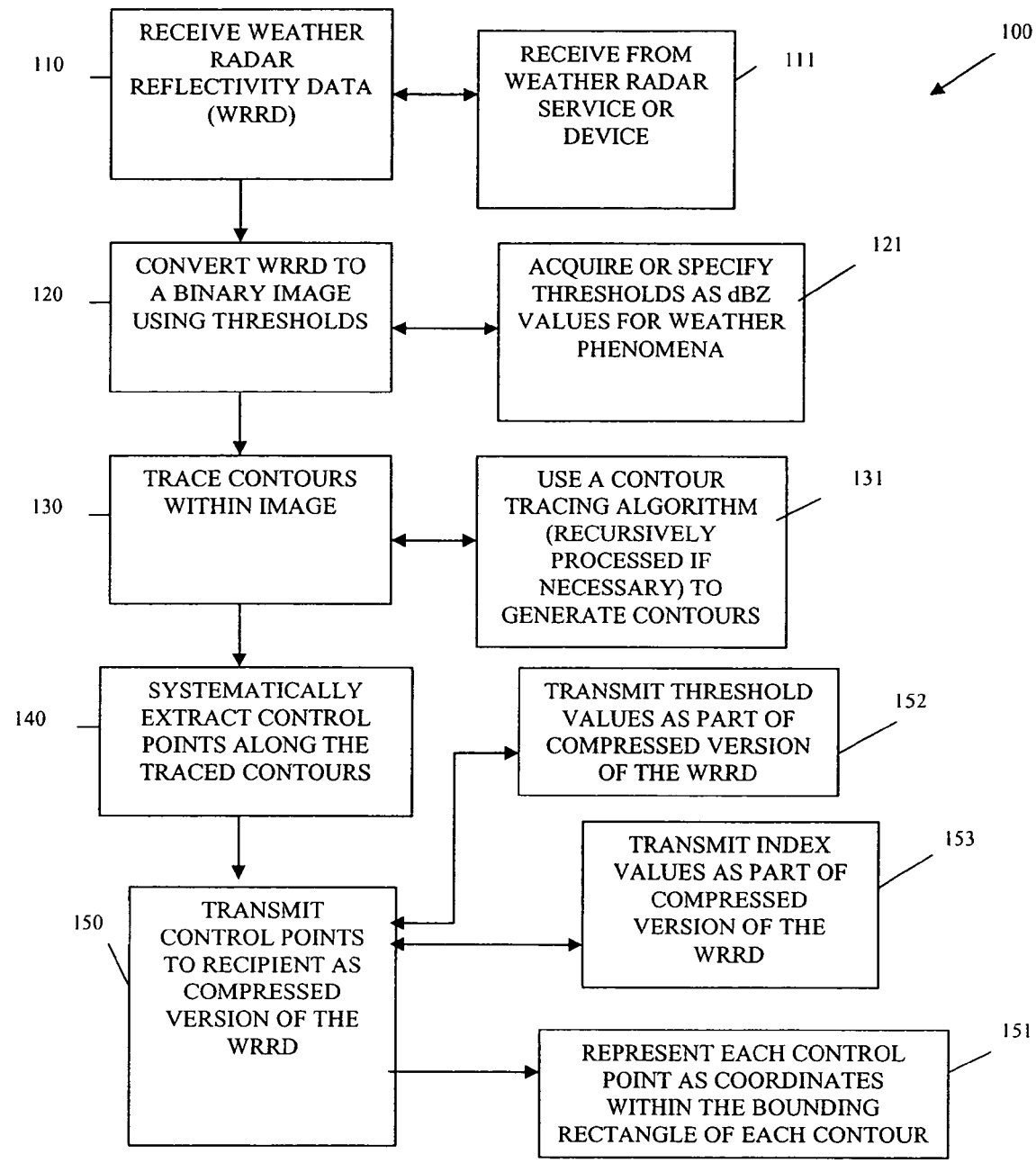
FIG. 1 is a diagram of method for compressing weather radar reflectivity data, according to an example embodiment.

FIG. 1 is a diagram of method 100 weather radar reflectivity data, according to an example embodiment. The method 100 (herein after "compression service") is implemented in a machine-accessible and readable medium and is accessible over a network. The network may be wireless, hardwired, or combinations of wireless and hardwired. The compression service performs ultra high compression on weather radar reflectivity data (WRRD). Ultra high means that the compression service is capable of reducing WRRD files by 100 times or more from their original sizes. Moreover, compression occurs without any significant loss of data quality.

Initially, at 110, the compression service receives WRRD. Acquisition of the WRRD can occur from a variety of sources. For example, the WRRD may be stored in memory of a processing device, stored within storage of the processing device, or combinations of memory and storage. In some arrangements, the WRRD may be obtained directly from radar in real-time and/or streamed over a network to the compression service.

In an embodiment, at 111, the source of the WRRD may be from a weather radar service or a weather radar device. The WRRD may be in a variety of formats such as manually digitized radar (MDR) formats, radar coded message (RCM) formats, next generation radar (NEXRAD) message formats, or NEXRAD information data service (NIDS) message formats. The formats include header information identifying their types and attributes associated with the WRRD that follows. Generally, the data values included within the WRRD are expressed as decibels of Z (dBZ), where Z is a measure of the normalized energy reflected back from weather phenomena (e.g., precipitation, precipitation density, etc.).

At 120, the WRRD is converted into a binary image. The original image format includes pixels having values that identify placement, color, intensity, etc. One technique for converting the WRRD into a binary image format is to assign a definite value (e.g., 1) to the pixels that exceed a predefined threshold value, and a second definite value (e.g., 0) to those pixels that fall below the threshold value. The threshold value may be one of the dBZ values for specific ranges of weather phenomena as published by the National Weather Service (NWS). For example, the NWS identifies the following range of dBZ values for certain weather phenomena. The dBZ values represent threshold values which are predefined and acquired from a table, such as the table presented here:

| Level | Reflectivity Interval dBZ | Precipitation Category |
|---|---|---|
| 1 | 18-30 | Light (Mist) |
| 2 | 30-41 | Moderate |
| 3 | 41-46 | Heavy |
| 4 | 46-50 | Very Heavy |
| 5 | 50-57 | Intense |
| 6 | >57 | Extreme (With Hail) |

Accordingly, in an embodiment, at 121, threshold values for weather phenomena are acquired for purposes of converting the WRRD into a binary image. It should be noted that the boundary within the binary image between one level (e.g., a level of 0's) and the next level (e.g., a level of 1's) is called a contour. Contours enclosing a zone of 1's are also called region contours; and boundaries within these region contours which have 0's are referred to as holes. The region contours and holes can be nested (i.e. there may be region contours within holes, and vice versa).

Once the WRRD is converted into a binary image having a plurality of pixels at each of the two levels, the compression service, at 130, traces contours within the binary image from selective groupings of the pixels. At 131, this tracing to recognize contours within the image may be recursive, such that nested contours are noted and defined.

A variety of techniques may be used, at 130, for tracing contours from selective groupings of the pixels within the image. As one example, a radial sweep algorithm may be used. Although a radial sweep may not process nested contours (e.g., holes, region contours, etc.) in one pass; it may be recursively processed, at 131, to trace nested contours (e.g., holes, region contours, etc.). During the tracing, pixels along the contour lines are incremented by 1 (to value of 2 at the first increment). So, overlapping or nested contour lines receive values of 3, etc. The direction of interior contour lines is determined using chain codes. The pattern of three successive pixels is utilized for tracing holes as well as region contours (nested contours).

Although a modified radial sweep algorithm was presented, by way of example only, for purposes of describing how contours may be traced within the image, the embodiments of this invention are not intended to be limited to any particular image contour tracing algorithm. That is, any existing or modified contour tracing algorithm may be used with the teachings presented herein if that algorithm traces or identifies contours and nested contours within the image.

Once the contour lines and patterns are traced or outlined within the image, the compression service, at 140, selectively extracts a plurality of control points (coordinates) about or along the traced contour lines. Control points are selected to describe faithfully the shape of the traced contour line for which they are generated.

Line simplification schemes are often used for extracting control points. These schemes are based on recursive binary curve splitting algorithms. However, in an embodiment, the compression service uses a novel technique for extracting control points. The novel technique averages the given contour line over a certain neighborhood of each point to obtain a smoothed curve. The deviation of each point on the original contour from the nearest point on the smooth curve is calculated.

For example, initially the control point extraction technique determines a point on the original contour which has a deviation of less than or equal to 1 pixel from the nearest point on the smooth curve, such a point is referred to as a zero-crossing point. All zero-crossing points on the contour are determined by traversing around the full contour.

Each point on the original contour that lies between two consecutive zero-crossings and has a maximum distance from the smoothed curve is considered to be a control point. However, if the length of the contour between any two zero-crossings exceeds a certain threshold, an extra control point is added between the control point as determined above and the zero-crossing points on either side of it. If small or smooth contours are present, then the contour extraction technique may simply select a predefined number of uniformly spaced points along the contour as the control points.

The control points are used to represent a compressed version of each closed contour corresponding to each assumed reflectivity threshold. This is so, because a subsequent decompression service may process the control points with curve fitting algorithms to recreate each initial contour. Examples of such algorithms are discussed herein and below with the discussion of the method 200 of FIG. 2.

Because the WRRD is reduced to a set of control points which are coordinate values, the WRRD experiences a substantial reduction in size after being compressed to the control points. A single control point is represented by a two-dimensional (2D) coordinate point with respect to a grid. The grid is a cartographic map of a given geographical area. The two dimensions may be denoted by a row (R) and a column (C), such that any particular control point (CP) may be expressed as $CP_1=(R_1C_1)$. If R is expressed by M bits of data and C is expressed by N bits of data, then the number of bits used to transmit a single CP is M+N where M equals ceil$[\log_2(R_{MAX})]$ and N equals ceil$[\log_2(C_{MAX})]$.

In an embodiment, at 151, the CP's may be further reduced or compressed in size by the compression service by representing each CP as an offset value within a given contour. For example, each contour may be preceded with a special header of information within the compressed WRRD to identify that contour's maximum and minimum values for columns C and rows R. This means that only the maximum and minimum coordinate pairs for each contour need to use a full M and N bits, and each CP can use less bits, since the true position of each CP can be calculated by a subsequent decompression service by adding the C and R minimum coordinate values as offset values to particular CP's. If the bounding rectangle of the $i^{th}$ closed contour is of size $M_iXN_i$ pixels, then the maximum number of bits used to transmit a single CP is ceil$[\log_2(M_i)]$+ceil$[\log_2(N_i)]$.

In still another embodiment, at 152, the compression service may also transmit header information with the compressed version of the WRRD represented by the CP's. The header information may include threshold values, which are processed by a subsequent decompression service to determine a specific color or effect to fill recreated contours with. These colors or effects may be conventional colors associated with specific weather phenomena.

As an alternative to transmitting the threshold values, the compression service, at 153, may simply transmit index values to a subsequent recipient or decompression service. The index values map to entries within a table and the entries house the threshold values (colors or effects) for weather phenomena. The decompression service may acquire the table as part of a header associated with the compressed WRRD from the compression service or alternatively the decompression service may maintain a version of the table independent of the compression service within its environment.

It has not been demonstrated how the voluminous WRRD may undergo ultra high compression with the techniques of the compression service that represents the processing of the method 100 depicted in FIG. 1. Essentially, an entire WRRD file may be reduced to a subset of control points and these points transmitted as a compressed version of the WRRD file. The compression level may be reduced by a factor of 100 or more. Moreover, the method 100 may be configured to define the length of contours and to selectively delete some control points. In this manner, the compression level and subsequent decompressed quality level may be customized. Additionally, in cases where B-spline functions are used the interpolation parameters may be adjusted to achieve a desired level of quality. Still further, B-spline interpolation may be applied to closed contours with singularity. The processing of the method 100 permits for the rapid transfer of WRRD over wireless communication links and utilizes a minimal amount of bandwidth. Moreover, as will be demonstrated below with the method 200 of FIG. 2 this is achieved without any substantial reduction in data quality.

Figure 2:
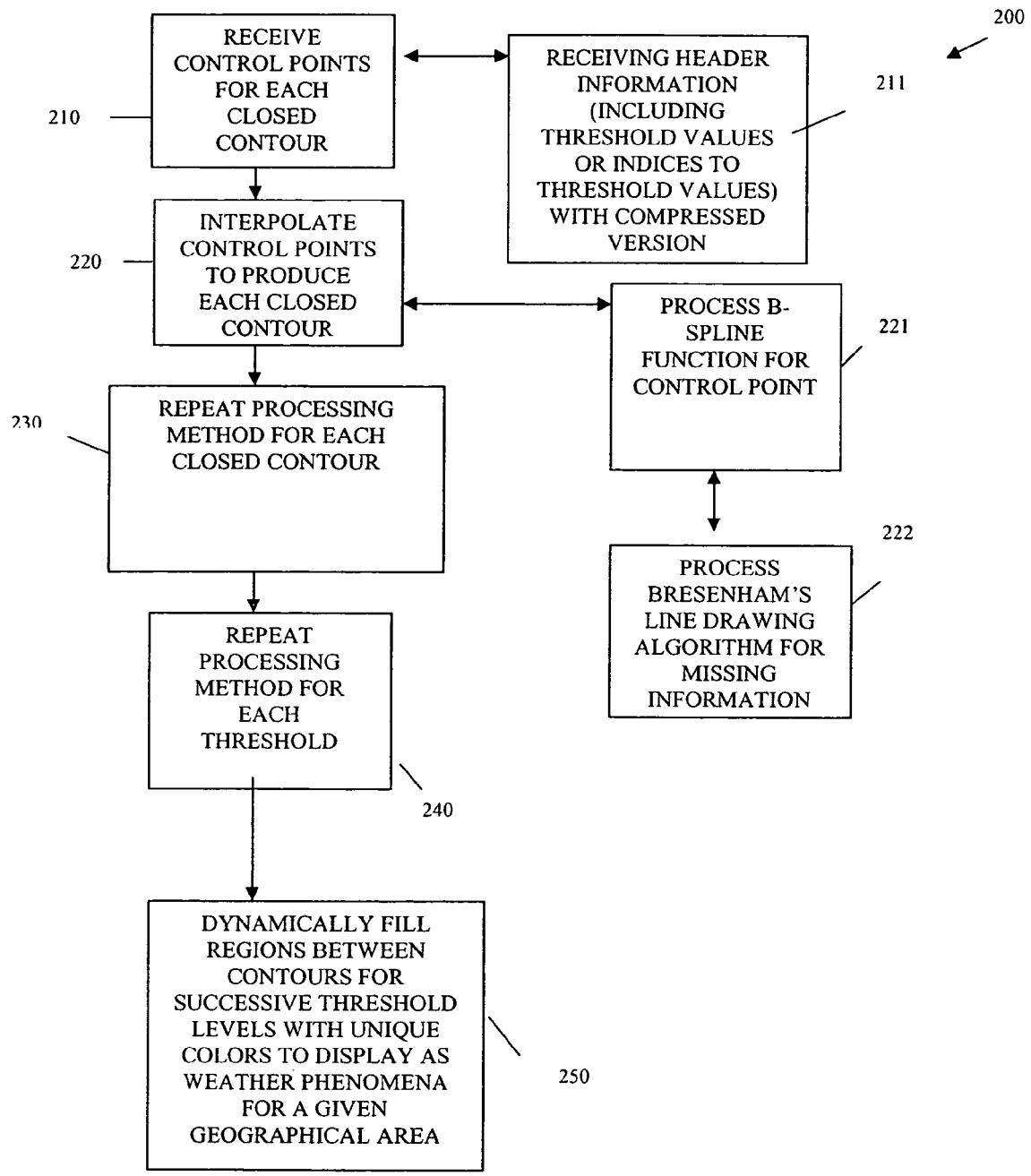
FIG. 2 is a diagram of method for decompressing weather radar reflectivity data compressed by the method of FIG. 1, according to an example embodiment.

FIG. 2 is a diagram of a method 200 for decompressing weather radar reflectivity data (WRRD), according to an example embodiment. The method 200 (hereinafter "decompression service") is implemented in a machine-accessible and readable medium and is operational over a network. The network may be wireless, hardwired, or a combination of wireless and hardwired. The decompression service decompresses compressed WRRD produced by the method 100 (compression service) of FIG. 1.

The decompression service may be resident in any processing device. In an embodiment, the decompression service is resident and processes within a processing device of an aircraft, where the decompression service communicates wirelessly with a compression service (e.g., the method 100 of FIG. 1) over a ground-to-air wireless communication link. The compression service streams or delivers WRRD and the decompression service decompresses that data and overlays it onto cartographic data for a given geographic area within a display for purposes of viewing real-time weather phenomena relative to land or marine cartography.

At 210, the decompression service receives compressed WRRD as a plurality of control points. In some embodiments, at 211, the decompression service may also receive header data with the WRRD that includes threshold values or indexes into a table associated with threshold values. The threshold values provide mappings to colors, effect, or legends associated with decompressed contour patterns and represent weather phenomena.

At 220, the decompression service interpolates the control points for purposes of producing contours. The contours may be nested within one another and each contour represents the intensity of weather phenomena for a given geographic area.

One technique for reconstructing the contour is to process, at 221, the control points in the compressed WRRD with a B-spline function. For example, a curve defined by the parameter t may be described by the B-spline function:

$$C(t) = \sum_{i=0}^{n} P_i N_{i,p}(t).$$

C(t) denotes the point on the curve at the parametric value t. The curve is drawn for various values of t, ranging from $t_{min}$ to $t_{max}$. Typically, $t_{min}=0$, $t_{max}=1$. The shape of the B-spline curve can be controlled by (n+1) control points, denoted by $P_i$, which are points in the object space. The positions of the control points are chosen so as to achieve the shape of the curve being modeled. The B-spline curve always lies within the convex hull of control points. Thus, the curve does not necessarily pass through the control points.

A knot vector is defined as $T=\{t_0, t_1, \ldots, t_m\}$; where the constants $t_i \in [0,1]$, and called knot values, are in non-decreasing order. The degree p of the curve is defined as $p=m-n-1$. The curve becomes smoother as the degree of the curve increases. The knot values $t_{p+1}, \ldots, t_{m-p-1}$ are called internal knots. If the internal knots are equally spaced then the curve is termed as a uniform B-spline curve. A B-spline with no internal knots is referred to as a Bezier curve.

The basis function $N_{i,p}(t)$ decides the extent to which a control point controls the curve at a parametric value t. For example:

$$N_{i,0}(t) = \begin{cases} 1 & \text{if } t_i \le t < t_{i+1} \text{ and } t_i < t_{i+1} \\ 0 & \text{otherwise} \end{cases};$$

$$N_{i,p}(t) = \frac{t - t_i}{t_{i+p} - t_i} N_{i,p-1}(t) + \frac{t_{i+p+1} - t}{t_{i+p+1} - t_{i+1}} N_{i+1,p-1}(t).$$

The B-spline basis function $N_{i,p}(t)$ has a non-zero value only in the open interval $t \in (t_i, t_{i+p+1})$. The sum of the control points is an affine combination, where the sum of all the basis function values of the control points is equal to 1. However, the sum of basis function values is not equal to 1 in the intervals $[t_0, t_p]$ and $[t_{n+1}, t_{n+p+1}]$ and no affine combination of the control points is possible. Hence, the curve is defined in the interval $[t_p, t_{n+1}]$ and end point interpolation is not possible. The end point interpolation is achieved by considering the first p+1 and last p+1 knots equal to $t_{min}$ and $t_{max}$, respectively. A curve is p-k times differentiable at a point where k duplicate knot values occur.

B-splines provide a common mathematical representation of standard analytical shapes as well as free-form curves and are projection invariant. Moreover, B-splines are also useful for the following reasons:
1) Changes to a control point only affects the curve in that locality;
2) Any number of control points can be added without increasing the degree of the curve;
3) Adding multiple points at or near a position draws the curve towards that position; and
4) Closed curves can be represented by making the first and last points the same.

In an embodiment, before the control points are interpolated they are adjusted to their original or true positions in the original cartographic grid for a given geographic area. That is, as the compressed WRRD used row and column min and max values, the min values are added for all the control points for a contour being developed.

The contour is produced in the following manner. Let $(n_i+1)$ be the number of control points received for the $i^{th}$ contour in the WRRD. The parameter t is incremented uniformly in the range of [0, 1] in steps of $$\frac{1.0}{(n_i + 1) \cdot k},$$

where k is an integer. Higher values of k may lead to duplicate points which may be discarded; any gaps resulting from this may be filled, at 222, with a Bresenham's line drawing algorithm.

The index i in the above process is incremented, at 230, to cover all the closed contours corresponding to a given threshold value in the WRRD.

The above processing is repeated, at 240, for all the threshold values for which contours were derived in the original WRDD.

After the contours are recreated from the control points, the regions of the contours are filled, at 250, with predefined colors. This produces a decompressed version of the originally compressed WRRD, which was received as control points. One technique for doing this, is to process a region filling algorithm on the contour patterns.

In embodiments, where threshold values are also received with the compressed WRRD or are obtainable from a predefined table, these threshold values are used to fill the contours with their appropriate colors. For example, the interiors of reconstructed region contours are filled with the threshold value of the contour using a region filling algorithm. The regions corresponding to higher thresholds are in general smaller than those for lower thresholds while the holes for the former are larger than those for the latter thresholds. The filling scheme fills these regions efficiently without any extra redrawing. In the image reconstruction algorithm, the contours of the regions as well as the holes corresponding to a given threshold are retrieved on the basis of the control points using the B-spline fit. Regions and holes are identified by means of a tag bit transmitted. The region within each contour but outside the holes is filled with the color value corresponding to the given threshold using a boundary fill algorithm. An arbitrary pixel inside the contours but outside any holes is located and is used as the seed for the boundary fill process. This sequence is repeated for all the thresholds used for contouring the image, with higher-threshold sections being successively superposed on those of lower threshold values. This yields a composite contoured image of the reflectivity field for a recipient, such as a pilot.

At 230 and 240, the processing of the method 200 may be performed in a recursive manner for purposes of processing nested contours (region contours, holes, etc.). At 250, the filled color contours that are recreated are dynamically overlaid on a cartographic grid at their appropriate locations within a display. Each contour represents the intensity of weather phenomena for a given geographical area within the cartographic grid.

The decompression service represented by the method 200 of FIG. 2 demonstrates how ultra high compressed WRRD produced by compression services of FIG. 1 may be decompressed in efficient manners to recreate weather phenomena represented within the compressed WRRD. The decompressed weather phenomena are overlaid as images within a cartographic grid on a display.

Figure 3:
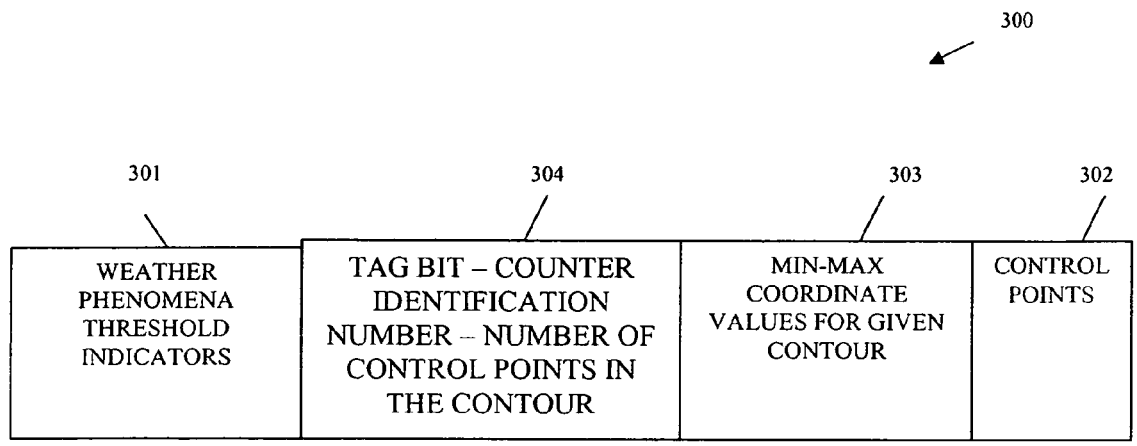
FIG. 3 is a diagram of a compressed weather radar reflectivity data structure residing in a computer-readable medium, according to an example embodiment.

FIG. 3 is a diagram of a compressed weather radar reflectivity data structure (compressed WRRD) 300. The compressed WRRD 300 is implemented in a computer-readable medium and is adapted to be stored in memory, storage, or combinations of memory and storage. Furthermore, the compressed WRRD 300 is adapted to be streamed or transmitted over a network from a compression service to a decompression service. The network may be wireless, hardwired, or combinations of wireless and hardwired. An example, compression service that initially produces an instance of the compressed WRRD 300 is the method 100 of FIG. 1. An example, decompression service that decompresses the compressed WRRD 300 for a recipient to view is the method 200 of FIG. 2.

The compressed WRRD 300 includes weather phenomena threshold indicators 301 and a plurality of control points 302. In an embodiment, the compressed WRRD 300 also includes, in 304, the tag bit (identifying region counter or hole) for each contour, the contour identifying number, and the number of control points in the contour. In 303 are included the min-max coordinate pair values for the given contour being represented by selective groupings of the control points 302.

The weather phenomena threshold indicators 301 represent dBZ values for weather phenomena, where dBZ refers to decibels of Z, and Z is the normalized amount of energy reflected back from particular weather phenomena. In an embodiment, the weather phenomena threshold indicators 301 are threshold values or ranges of values published by the National Weather Service (NWS) for weather phenomena, such as the ranges and phenomena described above with the description of FIG. 1.

In an alternative embodiment, the weather phenomena threshold indicators 301 are indices into a predefined table that is either maintained by a recipient that decompresses the compressed WRRD 300 or a predefined table that is provided as additional header information with the compressed WRRD 300 (not shown in FIG. 3). The indices are used to access entries within the predefined table and the entries include threshold values published by the NWS and expressed in dBZ units. The threshold values permit a decompression service to determine what colors or effects to apply to decompressed and recreated contours for weather phenomena.

The control points 302 are grouped or arranged according to the contours for which they were originally derived. These control points 302 are used by a decompression service to produce curves that trace or outline a contour, and the contour represents weather phenomena for a given location within a cartographic grid that depicts a specific geographic area. Thus, the control points 302 are decompressed by producing curves which are fitted between groupings of the control points, and a number of the produced curves fit together to produce unique contour patterns that represent weather phenomena for a given geographic area.

In some embodiments, a number of the control points 302 are nested with other control points 302 and these nested contour points 302 decompress into nested contours (region contours, holes, etc.).

Control points 302 are derived in the manners discussed above with respect to the method 100 of FIG. 1. Furthermore, control points 302 are decompressed for purposes of producing contours for compressed WRRD 300 in the manners discussed above with respect to the method 200 of FIG. 2.

In an embodiment, the compressed WRRD 300 may also include min-max coordinate pair values 303 for a given grouping of control points 302 representing a given contour. This is useful for determining where a decompressed and recreated contour is to be situated with respect to the cartographic grid. Each min-max coordinate pair value 303 provides an offset value for a row and another value 303 for an offset value for a column. The values 303 are added to control points 302 to acquire their true positions within the cartographic grid. This arrangement permits the control points 302 to be represented in with fewer bits of information and can further assist in reducing the size associated with the compressed WRRD 300.

The compressed WRRD 300 represents a novel data structure for compressed weather radar reflectivity data. This data structure is produced using an ultra high compression technique discussed as the method 100 of FIG. 1. It is ultra high because the size of the original WRRD is reduced substantially (in excess of 100× or more) within the compressed WRRD 300. This is achievable because of the novel derivation of the control points 302. The compressed WRRD 300 may be more efficiently transmitted over networks in a rapid manner while occupying non substantial bandwidth. A recipient of the compressed WRRD 300 then uses novel decompression techniques discussed above with respect to the method 200 of FIG. 2 for purposes of recreating the original WRRD in image forms which may be overlaid onto cartographic grid data to depict weather phenomena occurring over specific geographic areas. The compressed WRRD 300 and the method 200 of FIG. 2 is particularly useful to pilots for purposes of rapidly acquiring and viewing real-time weather information in a cockpit of an aircraft.

Figure 4:
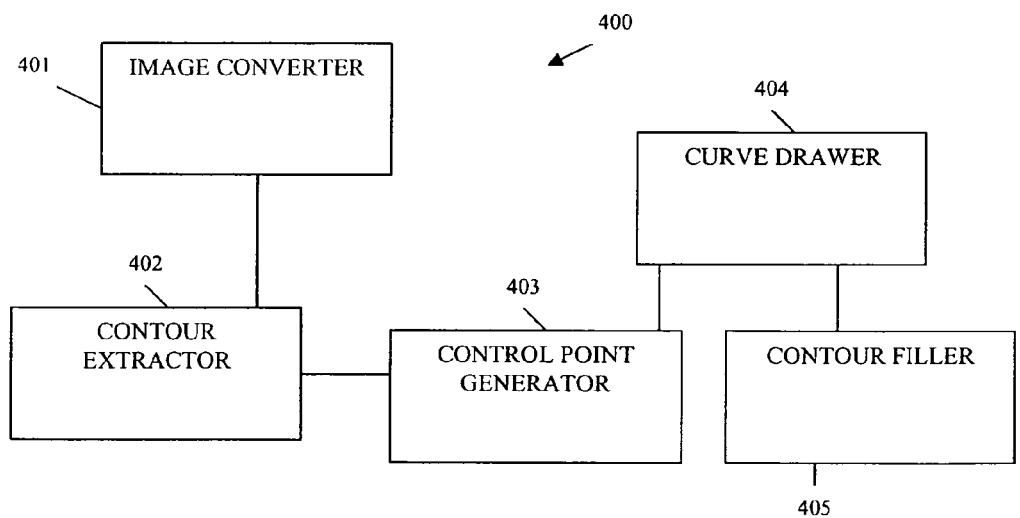
FIG. 4 is a diagram of a weather radar compression system, according to an example embodiment.

FIG. 4 is a diagram of a weather radar compression system 400, according to an example embodiment. The weather radar compression system 400 is implemented in a machine-accessible and readable medium and is operational over a network. The network may be wireless, hardwired, or a combination of wireless and hardwired. In an embodiment, the weather radar compression system 400 implements the method 100 of FIG. 1, the method 200 of FIG. 2 (during a decompression scenario), and produces or consumes the data structure 300 of FIG. 3.

The weather radar compression system 400 includes an image converter 401, a contour extractor 402, and a control point generator 403. In some arrangements, where the weather radar compression system 400 also provides decompression features, the weather radar compression system 400 also includes a curve drawer 404 and a contour filler 405.

The image converter 401 is adapted to provide a service that translates or converts weather radar reflectivity data (WRRD) into pixel values for a binary image format. One technique for doing this is to map predefined values for pixels or groups of pixels to threshold values or ranges of threshold values.

The threshold values are dBZ values provided in a WRRD transmission to represent predefined weather phenomena. The dBZ values or ranges may coincide with those that are available from the NWS. The WRRD transmission may be received by the image converter 401 from a radar service over a radio channel or directly from a radar device or piece of equipment. The radio channel may be communicated via traditional Radio Frequency (RF) transmissions. The format of the WRRD transmission may be received as MDR signals, RCM signals, NEXRAD signals, or NIDS messages.

The contour extractor 402 is adapted to receive the image of converted pixel values from the image converter 401 and to trace contours within the image. One technique for tracing the contours was discussed above with respect to the method 100 of FIG. 1. Additionally, traced contours may be nested with one another. Thus, in an embodiment, the contour extractor 402 is adapted to recursively process the image for purposes of detecting nested contours.

The control point generator 403 is adapted to select an optimal number of control points that represent the turning points of the contours, which are identified by the contour extractor 402. A technique for selecting and deriving the control points was discussed above with respect to the method 100 of FIG. 1.

During compression operations, the weather radar compression system 400 is adapted to receive instances of WRRD from radar services or devices and to produce the control points and/or threshold values or threshold indices as instances of a compressed WRRD. The compressed WRRD may then be sent or streamed over a network to a recipient.

In an embodiment, the recipient is an aircraft cockpit control system that includes a version or a portion of the weather radar compression system 400 for purposes of decompressing the compressed WRRD and displaying weather phenomena as sub-images overlaid on cartographic data within a display for a given geographic area.

If the weather radar compression system 400 is adapted to perform decompression, then the weather radar compression system 400 also includes a curve drawer 404 and a contour filler 405.

The curve drawer 404 is adapted to receive as input the control points previously produced by an iteration of the control point generator 403. The curve drawer 404 derives or recreates contours as sub-images having specific coordinate values within a given cartographic grid for a given geographic area. One technique for achieving this is using a B-spline function and processing technique, such as the one discussed above with the method 200 of FIG. 2. The contour filler 405 is adapted to receive recreated contours from the curve drawer 404 and to fill dynamically the region of each contour with a predefined color associated with specific weather intensities. One technique for filling the regions of the contours was discussed above with respect to the method 200 of FIG. 2.

It is now appreciated how weather radar reflectivity data may be compressed to substantially reduced sizes and then decompressed back to original representations. This permits radar data to be more efficiently transmitted and consumed over networks with minimal impact to bandwidth resources.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving weather radar reflectivity data;
   converting the weather radar reflectivity data to an image using thresholds;
   tracing contours within the image;
   selectively extracting control points around the traced contours, wherein the control points represent turning points within the traced contours, and wherein each control point is selectively extracted by averaging points along a particular traced contour line to obtain a smooth curve and comparing each point on the particular traced contour line to smooth curve points on the smooth curve to acquire deviations and when the deviations are less than or equal to one pixel identifying zero-crossing points there from and when a particular point on the particular traced contour line lies between two consecutive zero-crossing points and has a maximum predefined distance from the smooth curve identifying that particular point as one of the control points that is selectively extracted;
   transmitting the control points as a compressed version of the weather radar reflectivity data to a recipient;
   receiving the control points and the thresholds by the recipient;
   reconstructing the contours from the control points, by the recipient; and
   displaying at least one region defined by the contours corresponding to a specific threshold.

2. The method of claim 1 further comprising, transmitting the threshold values as part of the compressed version to the recipient.

3. The method of claim 1 further comprising, transmitting the control points and the threshold values as the compressed version to the recipient, which represents a compressed binary image that is compressed by a factor of 100 or more from an original size associated with an original binary image.

4. The method of claim 1, wherein selectively extracting further includes configuring a length that is to be associated with the extracted contours and selectively removing a number of the control points to achieve a desired level of compression and a desired level of quality.

5. The method of claim 1 further comprising, transmitting index values as part of the compressed version to the recipient, wherein the recipient uses the index values to acquire threshold values from a predefined table of threshold values.

6. The method of claim 1, wherein receiving further includes receiving the weather radar reflectivity data from a weather radar service or weather radar device.

7. The method of claim 1, wherein converting further includes acquiring the thresholds as predefined dBZ values for weather phenomena, where dBZ represents decibels of Z, and Z is a normalized amount of energy reflected back from the weather phenomena.

8. The method of claim 1, wherein tracing further includes processing a recursive contour extraction algorithm against the image to produce the contours, wherein a number of the contours may be nested within one another.

9. The method of claim 1 further comprising, representing each control point as an offset coordinate pair relative to a minimum and maximum coordinate pair for a given one of the contours.

10. A system, comprising:
    an image converter;
    a contour extractor; and
    a control point generator, wherein the image converter translates weather radar reflectivity data to a binary image of pixels, the contour extractor traces contours formed by groupings of like ones of the pixels, and the control point generator derives control points that define the contours, and wherein the control points represent a compressed version of the weather radar reflectivity data, and wherein the control points represent turning points within the traced contours, and wherein each control point is selectively extracted by averaging points along a particular traced contour line to obtain a smooth curve and comparing each point on the particular traced contour line to smooth curve points on the smooth curve to acquire deviations and when the deviations are less than or equal to one pixel identifying zero-crossing points there from and when a particular point on the particular traced contour line lies between two consecutive zero-crossing points and has a maximum predefined distance from the smooth curve identifying that particular point as one of the control points that is selectively derived by the control point generator.

11. A system of claim 10, wherein the image converter is adapted to identify threshold values in the weather reflectivity data as predefined weather phenomena and to translate each threshold value into a predefined pixel value or set of pixel values for the image.

12. The system of claim 10, wherein the contour extractor is adapted to perform a recursive analyses on the contours, wherein a number of the contours are nested within other ones of the contours.

13. The system of claim 10, wherein the weather radar reflectivity data is received as at least one of manually digitized radar (MDR) signals, radar coded messages (RCM), next generation of radar (NEXRAD) signals, a NEXRAD information data service (NIDS) messages, and other weather radar data formats.

14. The system of claim 10, wherein the weather radar reflectivity data is received over a radio channel.

15. The system of claim 14, wherein the radio channel is communicated via a Global Positioning Satellite (GPS) transmission.

16. The system of claim 10, wherein the weather radar reflectivity data is received from a weather radar device.

17. The system of claim 10 further comprising:
  a contour drawer that recreates the contours in response to the control points; and
  a contour filler that fills regions of the contours with predefined colors in response to threshold values associated with weather phenomena.

* * * * *